April 3, 1951 E. J. KOCH ET AL 2,547,328
LAWN SHAVER
Filed March 9, 1946 4 Sheets-Sheet 1
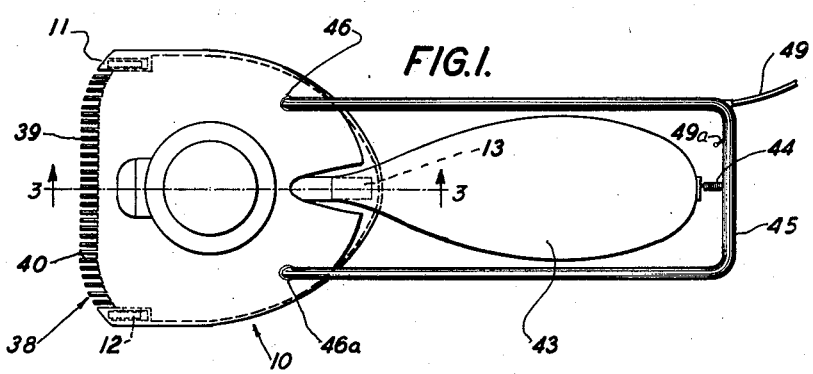
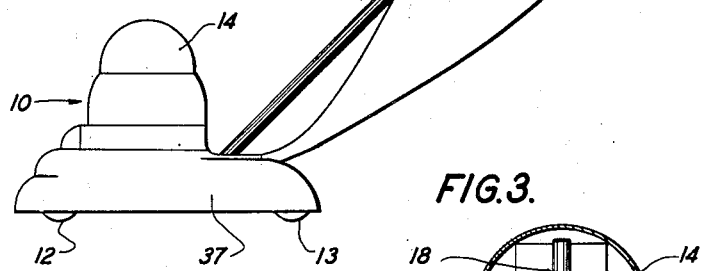
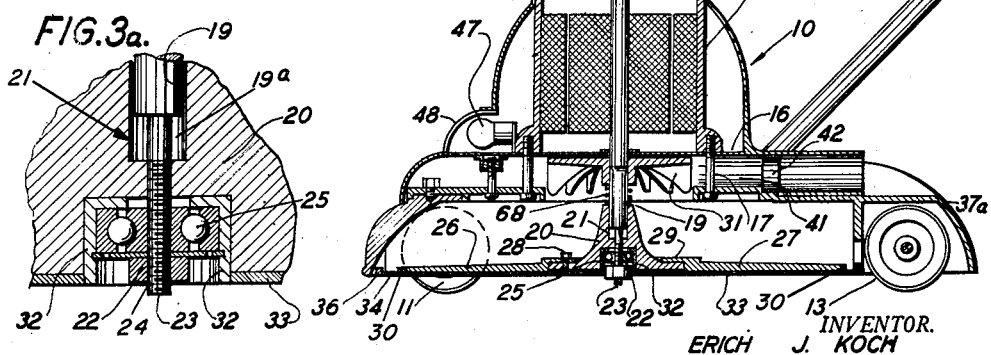
INVENTOR.
ERICH J. KOCH
BENJAMIN D. ALBIN
BY
Christie & Angus
ATTORNEYS April 3, 1951 — E. J. KOCH ET AL — 2,547,328

LAWN SHAVER

Filed March 9, 1946 — 4 Sheets-Sheet 2

INVENTOR.
ERICH J. KOCH
BENJAMIN D. ALBIN
BY
*Christie & Angus*
ATTORNEYS

April 3, 1951 E. J. KOCH ET AL 2,547,328
LAWN SHAVER
Filed March 9, 1946 4 Sheets-Sheet 3

INVENTOR.
ERICH J. KOCH
BENJAMIN D. ALBIN
BY
Christie & Angus
ATTORNEYS

April 3, 1951   E. J. KOCH ET AL   2,547,328
LAWN SHAVER

Filed March 9, 1946   4 Sheets-Sheet 4

INVENTOR.
ERICH J. KOCH
BENJAMIN D. ALBIN
BY
Christie & Angus
ATTORNEYS

Patented Apr. 3, 1951

2,547,328

UNITED STATES PATENT OFFICE 2,547,328

LAWN SHAVER

Erich J. Koch and Benjamin D. Albin,
Los Angeles, Calif.

Application March 9, 1946, Serial No. 653,310

14 Claims. (Cl. 56—25.4)

This invention relates to lawn shavers and has for its object to provide a lawn shaver of the power-driven type which is very light in weight and can be very easily pushed over a lawn as desired.

We carry out the foregoing object by the provision of a power-driven rotary blade designed and proportioned to perform a shearing action on the lawn at the desired height above the ground at which it is desired to shave the lawn. We prefer to drive the rotary shearing blade by an electric motor, as this form of motor is light in weight in comparison with its power and is easy to handle.

A feature of our invention relates to the provision of a guide which permits the grass or weeds, etc., to be combed, guided and retained in a vertical position so that the rotor blade performs an effective shearing action against them. This guide performs the additional function of acting as a guard, acting in conjunction with a skirt around the lower part of the housing to enclose and guard against the rotor. This guard tends to keep stones, nails and the like away from the rotor, and furthermore provides a guard against small stones or pebbles which might be struck by the rotor within the machine.

Another feature of our construction is the provision of a guide composed of comb teeth and slots which extend parallel to the direction in which the shaver is moved in cutting the lawn. The guide extends in a horizontal direction a slight distance above the surface of the ground and holds the blades of grass erect between the teeth. According to a preferred feature, the rotor is rotated just above the guide so as to shear off the blades of grass protruding through the guide. A further feature is the provision of means for adjusting the height of the rotor above the ground so that the grass may be cut at desired heights above the ground. This adjustment feature does not affect the relationship between the rotor blade and the horizontal guide, as provision is made for moving the comb and rotor together.

According to another feature, we provide means including a porous bag attached to the exhaust from a fan driven from the power source into which the cuttings are blown.

In accordance with another feature which may be used if desired, provision is made for increasing the swath of the blade by use of a plurality of rotor blades which may be geared to the same power unit.

The foregoing and other features of our invention will be better understood from the following detailed description and the accompanying drawings of which:

Fig. 1 is a top view showing one form of our invention;

Fig. 2 is a side view of the machine of Fig. 1;

Fig. 3 is a cross-section view taken at line 3—3 of Fig. 1;

Fig. 3a shows a detail, in cross-section on an enlarged scale, of a bearing construction shown in Fig. 10;

Figure 4:
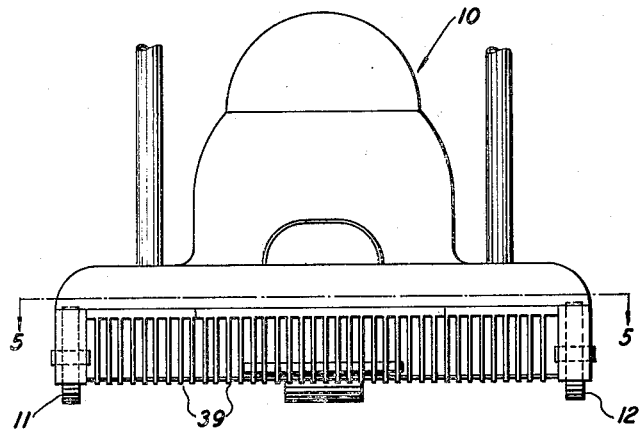
Fig. 4 is a front elevation view of the machine of Fig. 1.
Figure 5:
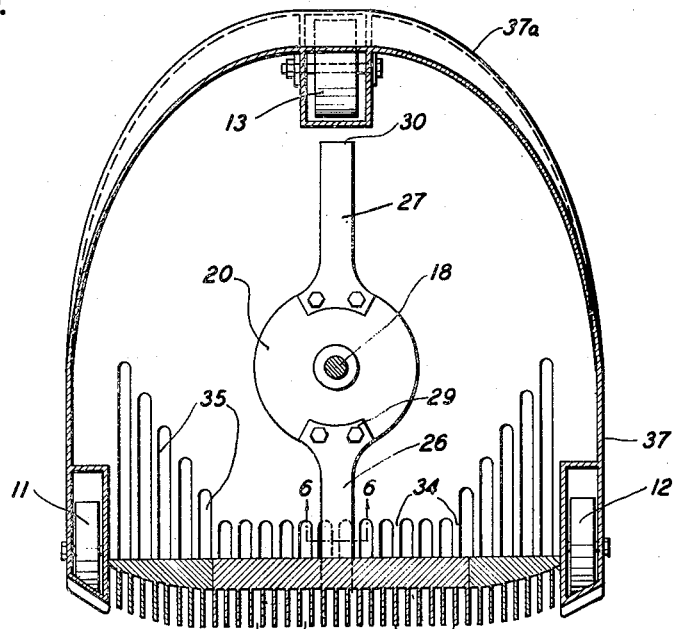
Fig. 5 is a plan cross-section view taken at line 5—5 of Fig. 4.

The modification of our invention shown in Figs. 1 to 6 comprises a compact housing 10 adapted to be rolled along a lawn by three wheels 11, 12 and 13 which are mounted for free rotation in any suitable way, for example by mounting them on spindles attached to the frame of the housing. The housing is formed with a central dome portion 14 in which is placed an electric motor 15, supported on a mounting platform 16 and held by bolts 17 to the frame. The lower end of the motor shaft 18 is provided with splines 19; and over these splines there is fitted an end member or hub 20 provided with a central bore 21 having internal splines 19a adapted to fit over splines 19. The hub member 20 is held on the end of the motor shaft 18 by means of a holding nut 22 on a stud 23 having threads 24 protruding from the end of the shaft and through member 20 as shown.

Member 20 acts as a hub to which a pair of rotor blades 26 and 27 are attached by suitable bolts 28. It is provided with a notched angle piece 29 for bolting to the hub 20; and the blade part is tapered somewhat to progressively smaller cross-sections toward the end 30. The cross-section of the blade at any point is rectangular as shown.

Figure 6:
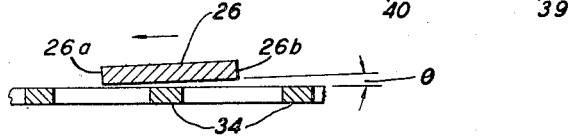
Fig. 6 is a cross-section view taken at line 6—6 of Fig. 5, showing a detail of the construction.
Figure 6A:
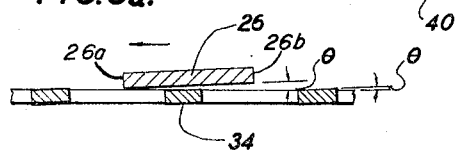
Fig. 6a is a cross section view taken at line 6—6 of Fig. 5 showing detail of a modified form of construction which may be used in place of that shown in Fig. 6.

The flat undersurfaces of the rotor blades are preferably tilted at a slight angle from the plane of the horizontal guide, as shown in Fig. 6. In Fig. 6, the leading edge 26a of the rotor blade is shown slightly closer to the guide than the lagging edge 26b; and the angle θ between the planes of the rotor blade and the guide may conveniently be about three degrees; although it will be understood that considerable variation from the particular angle will often be satisfactory. Fig. 6a shows an arrangement which may be used optionally in place of that of Fig. 6. In Fig. 6a the upper surfaces of the individual guide teeth and the lower surfaces of the blades are inclined at the angle θ. This tends to facilitate the shearing action.

There is hung from ball bearing 25 an inverted cup-like member 32 to which is attached a horizontal plate 33 having guide teeth 34 with slots 35 in between. The end of the guide teeth are turned up at 36 to provide rigidity for the comparatively thin section of metal. The guide is held in a fixed position against rotation by the contour of the lower skirt of the side housing 31 which extends down around the sides of the wheels as shown in Fig. 2. This skirt also extends around the back at 37a as well as at the two sides. The skirt does not extend across the front of the machine; but instead, there is provided across the front a comb 38 having downwardly extending comb teeth 39 with slots 40 therebetween. The lower edges of this forward comb extend down close to the base of the wheels so as to be near the ground. The forward ends of the teeth of the horizontal comb extend almost to meet the lower edges of the lower guide, as shown in Fig. 3.

A fan 31 is fastened to the motor shaft 18 just above the hub piece 20. The exhaust duct 41 from the fan is provided with a coupling device 42 for attachment of a porous bag 43. The perforations through the porous bag may be considerably larger than is commonly used for vacuum cleaners as it is only required that the bag retain the cut up grass and the like, and it does not have to retain fine particles like dust. The coarser the perforations the easier will the air blow through it. The bag is supported by a hook or the like 44, fastened at its upper end and attachable to the handle 45, which is fastened at the lower end 46 and 46a to the housing of the machine.

An electric lamp 47 may, if desired, be placed at the forward side of the housing behind a sheet of glass or other transparent material 48. The lamp can be made to serve the purpose of both indicating when current is sent to the motor and to provide light in the event the machine is being used at dusk.

An electric cable 49 may be attached to the machine and led to the motor in any suitable manner, for example, as in the case of an ordinary vacuum cleaner. If desired, the cable may be provided with an automatic pickup so that when the machine is pulled away from the power socket from which the cable receives its power, the cable can be automatically pulled out, and when the machine moves nearer the socket the cable is automatically taken up. The motor and lamp may be turned on and off by a suitable switch 49a at the handle.

In operation, the machine can be pushed over a lawn with very little effort very much like a vacuum cleaner is pushed over a carpet. With the electric power turned on, the motor shaft will rotate thereby producing rapid rotation of the rotor 26. The rotor 26 rotating in close proximity to the horizontal guide 33 will shear off the blades of grass over which the machine has run. As the skirts of the housing extend down close to the ground, most of the air will be drawn by the fan through the forward comb 38; so that the cuttings will be drawn up through the fan and out of the exhaust conduit 41 and into bag 43, the air escaping through the porosity of the bag material.

Adjustment of the cutting level of the rotor blades is provided by means of the nut 22. By turning up on this nut, the rotor hub 20 together with the horizontal guide plate 33 is raised or lowered on the splines of shaft 18, thereby regulating the level of the shearing. The compression spring 68 serves to keep the rotor and guide in the lowest position permitted by the adjusting nut 22.

Figure 7:
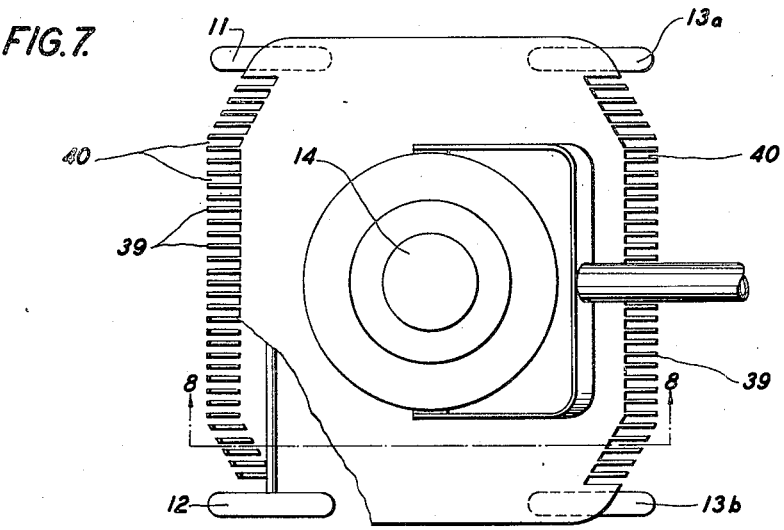
Fig. 7 is a top view showing another modification of our invention.
Figure 8:
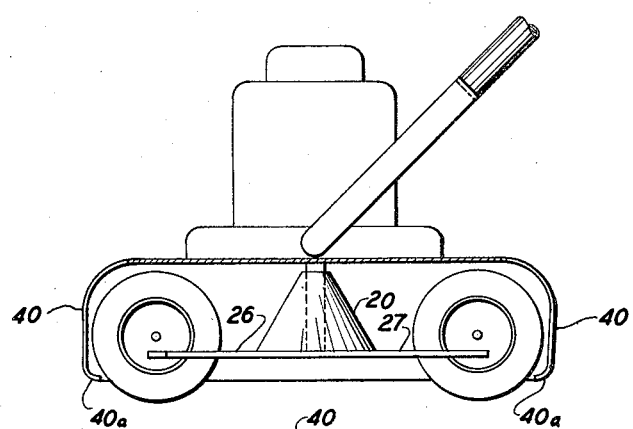
Fig. 8 is a cross-section view taken at line 8—8 of Fig. 7.

Figs. 7 and 8 show a modification of the invention in which the vertically depending comb teeth are placed across the rear of the housing skirt as well as at the front. In this way the machine is adapted to shave the lawn while moving in either a backward or a forward direction. To allow for the rearward travel with equal facility as the forward travel, the machine is made a four-wheel machine instead of a three-wheel machine as in the embodiment of Figs. 1 to 6. Accordingly, instead of a single wheel 13 at the rear as in the embodiment of Figs. 1 to 6, there are provided two rear wheels 13a and 13b.

The horizontal guide arrangement of Figs. 1 to 6 is omitted from Figs. 7 and 8, and in this respect the embodiment of Figs. 7 and 8 is somewhat simpler than the embodiment of Figs. 1 to 6. The depending comb teeth 40 in Figs. 7 and 8, however, are bent inwardly and extend horizontally for a small distance as shown at 40a in Fig. 8.

The rotor blades 26 and 27 are similar to those in the embodiment of Figs. 1 to 6; and the rotation is rapid enough to shear the grass with facility without benefit of the horizontal comb.

The embodiment of Figs. 7 and 8 is further simplified by the omission of the fan and the collection bag, although these may be added if desired.

Figure 9:
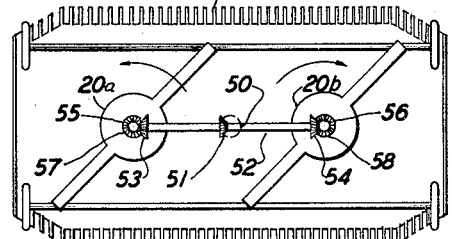
Fig. 9 is a plan view in cross-section showing another modification of the invention.

Fig. 9 shows a further modification of my invention in which two sets of rotor blades are used instead of one set. In this way a wide swath is obtained with relatively short blades. Fig. 9 does not show the complete machine, but merely shows a cross-section view taken at a horizontal plane just above the rolling wheels of the machine. There is fastened to the motor shaft 18, a bevel gear 50 which matches with another bevel gear 51 mounted on a horizontal shaft 52 which is journaled by some suitable means to the frame. Similar bevel gears 53 and 54, meshing with other bevel gears 55 and 56 respectively on vertical shafts 57 and 58 respectively, serve to rotate these latter shafts from the power drive. The shafts 57 and 58 are supplied with hubs 20a and 20b corresponding with the hub 20 of the other embodiments. Each of the hubs carries a pair of rotor blades as in the case of the preceding embodiments. As the orbits of rotation of the end of the rotor blades overlap somewhat, the blades should be arranged relative to each other so they do not strike each other in passing.

In this embodiment, the comb teeth are of the general form shown in Figs. 7 and 8, and the machine is adapted for either forward or reverse movement. As the rotor blades do not pass closely over the comb teeth, the shearing action is dependent upon the speed of rotation of the rotor as in the case of Figs. 7 and 8.

Figure 10:
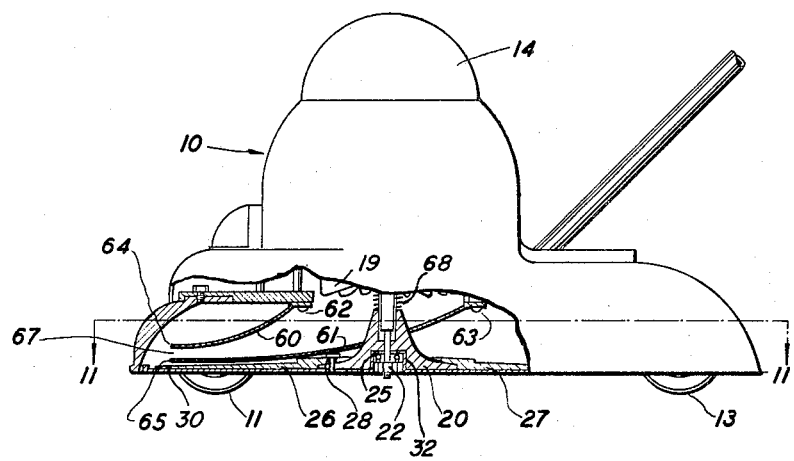
Fig. 10 is a side elevation partially in section showing a modified form of our invention.
Figure 11:
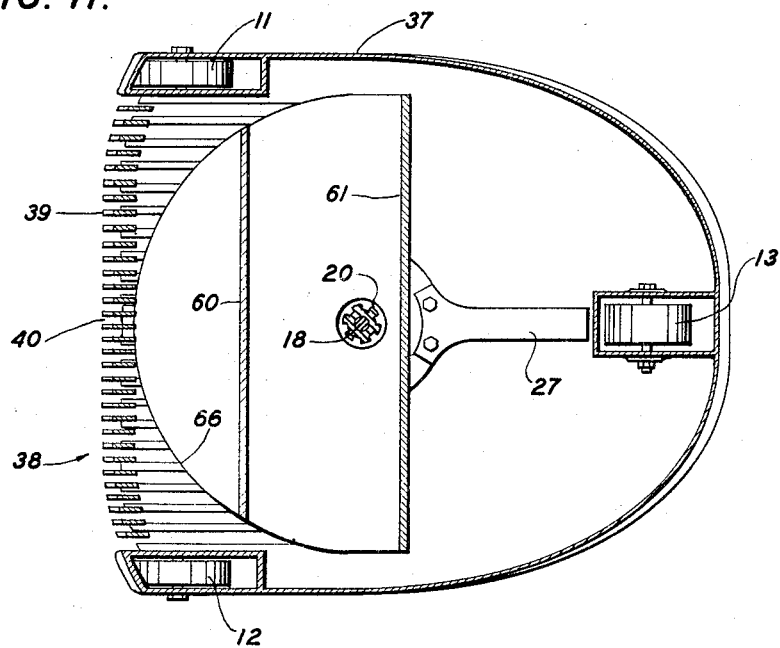
Fig. 11 is a cross-section view taken at line 11—11 of Fig. 10.

Figs. 10 and 11 show a form of our invention utilizing a baffle for the flow of air, to increase the effectiveness of the suction when a suction fan is used. The arrangement of Figs. 10 and 11 is similar to that of Figs. 1 to 6, the principal difference being the addition of baffle plates 60 and 61 in Figs. 10 and 11. The baffles are in the form of plates which extend downwardly and forwardly and to the sides so that their rims 64 and 65 are in the form of circular arcs having a radius which is slightly less than the radius of the cutting blades 26; that is, the rims are just inside the circular arc formed by the sweep of the cutting blade 26, and extend over approximately the forward half circle of cutting blade sweep. The upper baffle plate 60 is held by suitable bolts 62 and curves downwardly and forwardly and outwardly as shown. It is provided with a central opening large enough to allow it to be placed over the hub member 20. The lower baffle plate 61 is similarly fastened by suitable bolts 63 to the frame and this also curves downwardly and forwardly as shown in Fig. 10. A space 67 is left between the arcuate edges 64 and 65, forming the arcuate entrance to the passageway formed between the baffles. By this arrangement, the cuttings are drawn up into the entrance 67 and between the baffle plates to the fan.

This baffle arrangement may be added as an optional arrangement where a fan is used. In some instances the relationship between the rotor blades and the fan may be such that the fan does not have enough suction to draw up most of the cuttings. By the arrangement shown in Figs. 10 and 11, virtually all of the cuttings may easily be drawn up between the baffles and in this way a smaller proportion of the cuttings is allowed to fall on the lawn.

From the foregoing descriptions of embodiments of our invention, it will be recognized that we have provided an improved lawn shaver which can be combined with a vacuum-operated pickup for the shaver; and that the machine can be rolled over the lawn as easily or more easily than ordinary vacuum cleaners can over a carpet. Our machine operates by a shearing action rather than a knife-edge action, and does not require the cooperation of engaging knife edges as in the case of an ordinary lawnmower. Instead, the squared shearing edge of the rotor performs the shearing action; and this is facilitated by the use of the horizontal guide as in the embodiment of Figs. 1 to 6, which serve the purpose of keeping the grass and weeds upright to enable them to be easily sheared by the rotor.

The lawn shaver according to our invention will shave the lawn at varying heights from as close as to about one-half inch from the ground to greater heights as may be desired. Furthermore, due to the configuration of the housing and skirts of the machines, they will cut close to fencing, shrubbery, trees and the like. For example, they may cut as close as up to one-half inch of such obstructions. They will also cut underneath overhanging shrubbery and flowers without disturbing or destroying them as the branches cannot tangle with the rotor.

The rotor furthermore, will cut grass into minute particles permitting the same to be very easily sucked up and collected in a bag and readily disposed of.

We claim:

1. In a machine for shaving lawns, a power-driven rotor blade rotatable on a vertical shaft, and means for adjusting the height of the rotor blade above the ground, said means comprising splines on the shaft and corresponding splines on the hub of the rotor blade, an adjustable nut for adjusting the vertical position of the hub on the shaft, and a spring means for tending to keep the hub in the lowest position permitted by the nut.

2. A machine adapted to move over a lawn and shave it, comprising a power-driven rotary cutting blade, rotatable in a horizontal plane over the lawn, said rotary cutting blade being of substantially rectangular cross-section, a horizontal plate located beneath the rotor and provided with teeth which extend in the direction of movement over the lawn so that the blades of grass protrude upwardly between the teeth, the rotor blade being located close to and above the teeth, the lower surface of the rotor blade adjacent the teeth being inclined at an angle of about 3° from the plane of rotation, in the direction opposite the direction of rotation of the rotor, whereby effective shearing action occurs.

3. A machine adapted to move over the lawn and shave it comprising a power-driven rotor blade rotatable in a substantially horizontal plane over the lawn, a plurality of teeth situated beneath the rotor blade and extending in the direction of movement over the lawn so that the blades of grass protrude upwardly through the teeth, the rotor blade being located close to and above the teeth, baffle means comprising an upper and lower baffle plate providing an air conduit, the mouth of the conduit being in the form of an arcuate space between the baffles, the arcuate space being located just above and in proximity to the arcuate path of the rotor blade, and each baffle plate curving upwardly from the mouth and the distance between the plates progressively increasing in the direction away from the mouth, a fan located in the conduit above the blade and an outlet from the conduit at the side of the fan remote from the mouth, whereby the lawn is sheared by the rotor blade and the cuttings enter the mouth and are carried through the conduit to the outlet.

4. A machine according to claim 3 in which the fan is located on the rotor shaft.

5. In a machine adapted to roll over a lawn and shave it, a power-driven rotary blade cutter rotatable in a horizontal plane over the lawn, a fan mounted above the rotary cutter, a hood extending downwardly over said fan and said rotary cutter, a comb located at the front end of said hood and in front of the rotary cutter and provided with teeth which extend downwardly toward the ground so that the blades of grass can pass through the slots between the teeth, horizontal guide plate located beneath the rotary cutter and provided with horizontal comb teeth which extend horizontally in the direction of motion of the machine over the lawn so that the blades of grass protrude upwardly between said horizontal teeth, the rotary cutter being located close to and above the horizontal comb teeth whereby a shearing action occurs as the cutter rotates, an exhaust outlet in said hood, and means for attaching a receptacle to the exhaust outlet, said hood having a skirt around the base portion thereof, said skirt extending downward about said cutter and close to the ground, said skirt fitting closely about said plate at the back and sides thereof, whereby most of the air drawn in by the fan passes through said front teeth and past the rotary cutter and past the fan, thereby picking up the sheared grass and exhausting it through the exhaust outlet.

6. In a machine adapted to roll over a lawn and shave it, a power-driven rotary blade cutter rotatable in a horizontal plane over the lawn, a power-driven fan, horizontal comb means located beneath said rotary cutter, said comb means being provided with teeth which extend horizontally in the direction of motion of the machine over the lawn, so that the blades of grass protrude upwardly between said horizontal comb teeth, said rotary cutter being located close to and above the horizontal comb teeth whereby a shearing action occurs, housing means enclosing said fan and having an outwardly-facing mouth adjacent said comb means for drawing air inwardly along the upper surface of said rotary cutter, said housing means having an exhaust outlet for said fan, the air-moving capacity of said fan being so great relative to any tendency of said cutter to throw air outwardly during rotation that air is actually drawn inwardly with sufficient force to support uncut blades of grass within the rotary path of said cutter, and means for attaching a receptacle to the exhaust outlet for receiving grass cuttings.

7. In a machine adapted to roll over a lawn and shave it, a horizontal rotary blade mounted on a vertical shaft that is adapted to be rotated rapidly by a power source, said rotary blade having a tendency to throw air outwardly to bend blades of uncut grass forwardly as the machine advances over the lawn, a power-driven fan, housing means enclosing said fan, said housing means having an outwardly-facing mouth adjacent the path of rotation of the outer ends of said blades, said fan being so constructed and arranged as to tend to draw air into said mouth, the air-moving capacity of said fan being sufficiently great relative to such tendency of said cutter so that air is drawn into said mouth past said rotary blades with sufficient force to cause uncut blades of grass to protrude upwardly into the path of rotation of said rotary blade whereby such blades of grass are sheared, an exhaust outlet in said housing means, and means for attaching a receptacle to the exhaust outlet, whereby the grass cuttings are picked up and exhausted through the exhaust outlet.

8. In a machine adapted to roll over a lawn and shave it, a rotary blade rotatable in a horizontal plane over a lawn, a fan located above said rotary blade, a guide plate located beneath said rotary blade, said guide plate having teeth located close to and beneath said rotary blade for affecting a shearing action with said rotary blade when the latter rotates, a hood cooperating with said guide plate to form a housing substantially enclosing said fan and said rotary blade, said housing being provided with an outwardly-facing mouth located above said teeth, and said hood being provided with an exhaust outlet communicating with said fan, the air-moving capacity of said fan being so great relative to any tendency of said rotary cutter to force air outwardly through said mouth during rotation that air is drawn into said mouth whereby blades of uncut grass are maintained in cutting position between said teeth as said rotary blade rotates and grass cuttings are drawn through said mouth into said housing and up toward said fan and discharged through said outlet.

9. In a machine for shaving lawns, a power-driven rotary blade having a hub rotatably supported on a vertical shaft, a horizontal guide-member supported on said shaft through a bearing beneath said rotary blade, means for preventing rotation of said guide-member whereby grass is sheared between said blade and said guide-member as said blade rotates, and means for adjusting the height of said rotary blade and said guide-member together above the ground, said means comprising splines on said shaft and corresponding splines on said hub, an adjustable nut for adjusting the vertical position of said guide-member on the shaft, and a spring means for tending to keep said hub in the lowest position permitted by said guide-member.

10. A machine adapted to roll over a lawn and shave it comprising a rotary blade having a hub supported on a rotatable vertical shaft, a fan impeller supported on said shaft above said cutter, a horizontal guide-plate supported on said shaft through a bearing close to and beneath said rotary blade, said guide-plate being provided with teeth at one end thereof, said teeth extending horizontally in the direction of motion of the machine over the lawn, a hood enclosing said fan and having an outwardly-facing mouth adjacent said comb means for drawing most of the air pumped by said fan inwardly along the upper surface of said rotary blade, said hood having an exhaust outlet adapted for attachment of a receptacle for receiving grass cuttings raised by said fan, said hood having a skirt extending downwardly about said guide-plate, whereby said guide-plate may be raised and lowered therein, the forward side of said skirt being slotted to form downwardly extending comb teeth opposite said horizontal comb teeth, means for preventing rotation of said guide-member in said hood whereby grass is sheared between said blade and said horizontal teeth as said shaft rotates, and means for adjusting the height of the rotary cutter and said guide-plate together above the ground and within said hood, said means comprising splines on the shaft and corresponding splines on the hub of the rotor blade, an adjustable nut for adjusting the vertical position of said guide-plate on the shaft, and a spring means for tending to keep the hub in the lowest position permitted by said guide-plate.

11. A machine adapted to roll over a lawn and shave it comprising a rotary blade cutter having a hub and supported on a rotatable vertical shaft and adapted to be rotated by a power source, a fan impeller driven by said power source, a horizontal guide-plate supported on said shaft through a bearing close to and beneath the rotary cutter, said guide-plate being provided with teeth at the forward end thereof, said teeth extending horizontally in the direction of motion of the machine over the lawn, a hood enclosing said fan and having an outwardly-facing mouth adjacent said comb means for drawing most of the air pumped by said fan inwardly along the upper surface of said rotary cutter, said hood having an exhaust outlet adapted for attachment of a receptacle for receiving grass cuttings raised by said fan, said hood having a skirt extending downwardly about said guide-plate, whereby said guide-plate may be raised and lowered therein, the forward side of said skirt being slotted to form downwardly extending comb teeth opposite said horizontal comb teeth, means for preventing rotation of said guide-plate whereby grass is sheared between said cutter and said teeth as said shaft rotates, means including wheels supporting said shaft for maintaining said cutter and said guide-plate parallel to the ground, and means for adjusting the height of the rotary cutter and said guide-plate together above the ground whereby the length of the grass cut may be varied while they are maintained parallel to the ground.

12. A machine adapted to roll over a lawn and shave it comprising, a power-driven rotary blade rotatable in a horizontal plane over the lawn, a fan located above said rotary blade, a housing for said fan, said housing having an exhaust outlet, and a conduit formed by baffles extending from a position near the forward path of sweep of said rotary blade toward the fan, the air-moving capacity of said fan being so great relative to any tendency of said rotary blade to throw air outwardly during rotation that air is drawn past said rotary blade into said conduit with sufficient force to support uncut blades of grass within the rotary path of said cutter, whereby the grass is cut and the cuttings are drawn past the fan and discharged through said exhaust outlet.

13. In a lawn shaving machine having wheels adapting it for rollnig over a lawn, a power-driven rotary blade rotatable in a horizontal plane over the lawn, a fan located over said rotary blade, a conduit formed by baffles extending from a position near the forward portion of the path of sweep of said rotary blade toward said fan, the baffles being arced in a horizontal plane to form an arcuate inlet to said conduit at the forward portion of the path of sweep of said rotary blade, the air-moving capacity of said fan being so great relative to any tendency of the rotary blade to throw air outwardly during rotation that air is drawn past said rotary blade into said arcuate inlet with sufficient force to support uncut blades of grass in cutting position within the forward portion of the path of sweep of said rotary cutter whereby grass is cut and the cuttings are drawn into said inlet.

14. In a lawn shaving machine having wheels on opposite sides thereof adapting it for rolling over a lawn, a rotary cutter mounted for rotation in a horizontal plane in the area between said wheels, the diameter of the cutter being such that the area of rotation of the cutter occupies most of the space between the paths of travel of said wheels, a fan, conduit means including a housing enclosing said fan, said conduit means having an outwardly facing mouth extending substantially across said space at the front of the area of rotation of said cutter, said mouth being adjacent to the path of rotation of the outer ends of said cutter, said conduit means having an exhaust outlet for said fan, the air-moving capacity of said fan being so great relative to the tendency of said cutter to throw air outwardly during rotation that air is drawn into said mouth with sufficient force to support uncut blades of grass in cutting position within the rotary path of said cutter.

ERICH J. KOCH.
BENJAMIN D. ALBIN.

REFERENCES CITED

The following references are of record in the file of this patent:

UNITED STATES PATENTS

| Number | Name | Date |
| --- | --- | --- |
| 990,998 | Maldino | May 2, 1911 |
| 1,614,386 | Peebles et al. | Jan. 11, 1927 |
| 1,622,611 | Sera | Mar. 29, 1929 |
| 1,827,559 | Beazley | Oct. 13, 1931 |
| 1,880,154 | Rotondo et al. | Sept. 27, 1932 |
| 1,992,820 | Gedney | Feb. 26, 1935 |
| 2,154,564 | Eisenlohr | Apr. 18, 1939 |
| 2,165,551 | Iverson | July 11, 1939 |
| 2,198,526 | Cockburn | Apr. 23, 1940 |
| 2,253,452 | Urschel | Aug. 19, 1941 |
| 2,471,367 | Caveness | May 24, 1949 |